Figure 1:
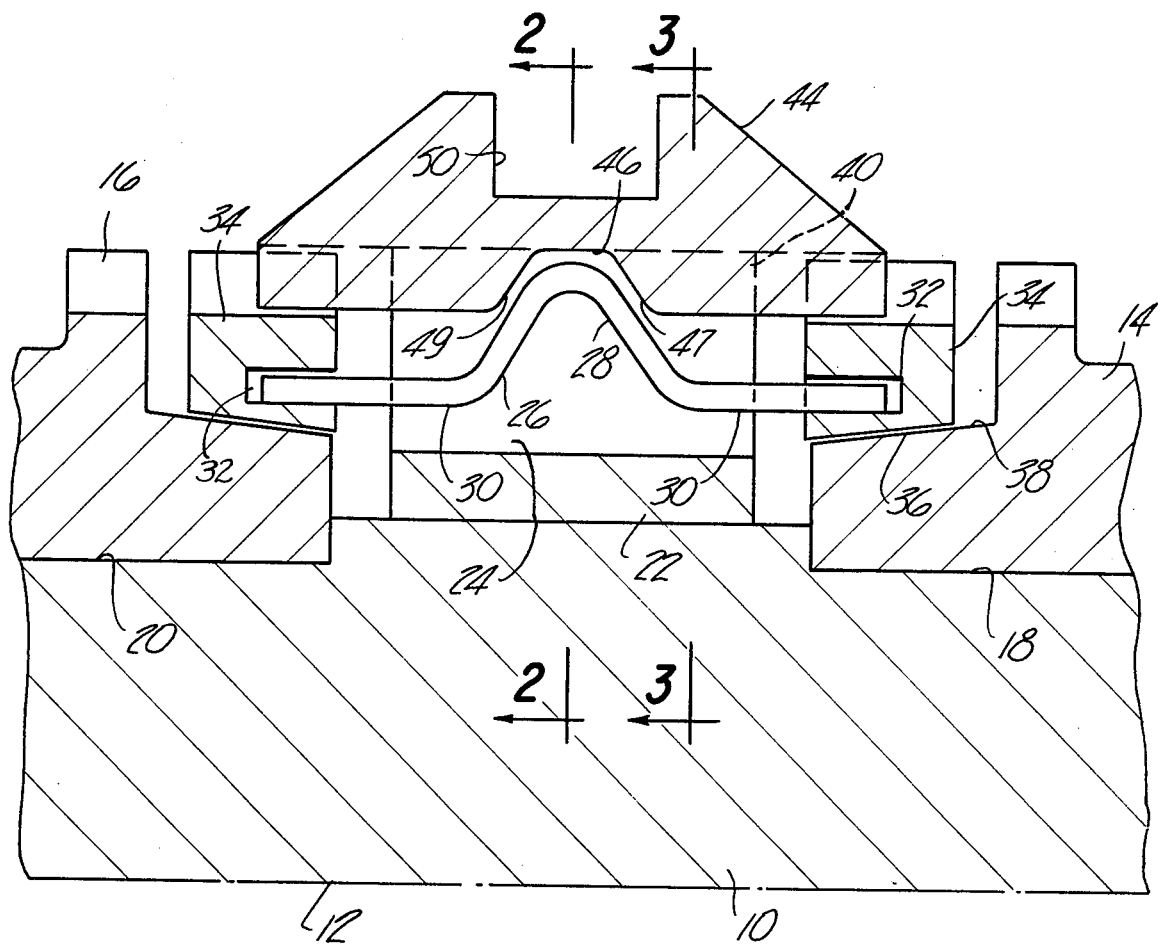

United States Patent [19]

F'Geppert

[11] 4,132,298
[45] Jan. 2, 1979

[54] TRANSMISSION SYNCHRONIZER

[75] Inventor: Erwin F'Geppert, Novi, Mich.

[73] Assignee: The United States of America as represented by the Secretary of the Army, Washington, D.C.

[21] Appl. No.: 815,349

[22] Filed: Jul. 13, 1977

[51] Int. Cl.² .............................................. F16D 23/04
[52] U.S. Cl. .................................................. 192/53 B
[58] Field of Search .................. 192/53 B, 53 E, 53 F

[56] References Cited
FOREIGN PATENT DOCUMENTS

| | | | |
|---|---|---|---|
| 729880 | 1/1943 | Fed. Rep. of Germany | 192/53 G |
| 1094051 | 12/1960 | Fed. Rep. of Germany | 192/53 F |
| 1555158 | 11/1966 | Fed. Rep. of Germany | 192/53 F |
| 1181512 | 1/1959 | France | 192/53 G |

Primary Examiner—Allan D. Herrmann
Attorney, Agent, or Firm—Peter A. Taucher; John E. McRae; Nathan Edelberg

[57] ABSTRACT

A transmission synchronizer comprising one piece spring elements adapted to be cam-actuated by a shift collar to provide axial operating forces on synchronizer gears. Each spring element comprises a central V section and straight end sections extending into blind holes in the synchronizer gears. Cam force on apex areas of the V sections produces resilient force on a selected synchronizer gear for bringing the driven gear up to speed before engagement of the shift collar teeth with the driven gear.

1 Claim, 4 Drawing Figures

4,132,298

TRANSMISSION SYNCHRONIZER

BACKGROUND AND SUMMARY OF THE INVENTION

As shown for example at page 179 of the book titled "Torque Converters or Transmissions" authored by P. M. Heldt, a conventional known transmission comprises a drive shaft and two axially spaced pinion gears freely rotatable thereon. The shaft space between the pinion gears is splined to receive an internally splined shift collar. Axial displacement of the shift collar from a centered position causes teeth on the collar to mesh with teeth on the selected pinion gear. It is necessary in this type of transmission that the selected pinion gear be brought up to speed before the shift collar teeth engage the pinion gear teeth. This is conventionally accomplished by friction clutch elements floatably carried on the pinion gears. Each one of the clutch elements is keyed to the shift collar so that axial movement of the collar applies a resilient axial force on the selected clutch element; after the clutch element is drivingly engaged with a companion clutch surface on the pinion gear the shift collar continues its axial movement into mesh with the gear.

Under conventional practice the shift collar applies a resilient axial force on its synchronizer clutch element via a series of small spring-urged bars keyed to the drive shaft. Cam surfaces on the shift collar exert axial forces on the spring-urged bars; as the synchronizer clutch is moved axially into engagement with the pinion gear clutch the spring-urged bars deflect radially inwardly toward the shaft axis to permit continued axial motion of the shift collar.

The present invention concerns a redesign of the spring-bar units to prevent inadvertent dislodgment of the bars caused by accumulations of manufacturing tolerances and/or wear on the bar surfaces. The redesigned units are formed as one piece wire spring elements having central V sections and straight end sections extending oppositely from the V extremities into blind holes in the synchronizer clutch elements. The blind holes are of sufficient depth to compensate for tolerance build-ups and/or wear without permitting dislodgment of the spring elements. The spring elements are designed for easy installation into the relatively confined space between two synchronizer clutches. Principal advantages of the design are reduction in number of parts, ease of installation, better assurance against jamming or dislocation of the spring elements, and longer service life for a given amount of wear.

The invention described herein may be manufactured, used, and licensed by or for the Government for governmental purposes without payment to me of any royalty thereon.

THE DRAWINGS

FIG. 1 shows a half section through a transmission incorporating one embodiment of this invention.

Figure 2:
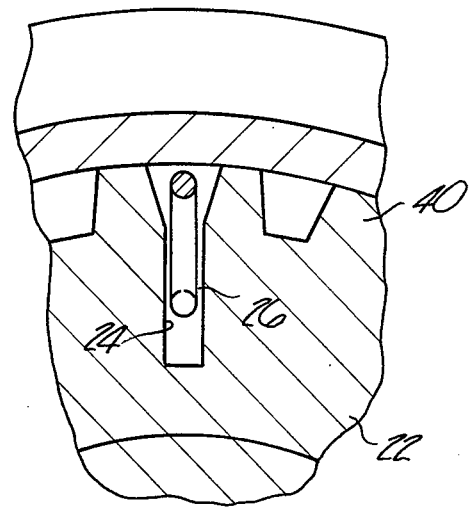
Figure 3:
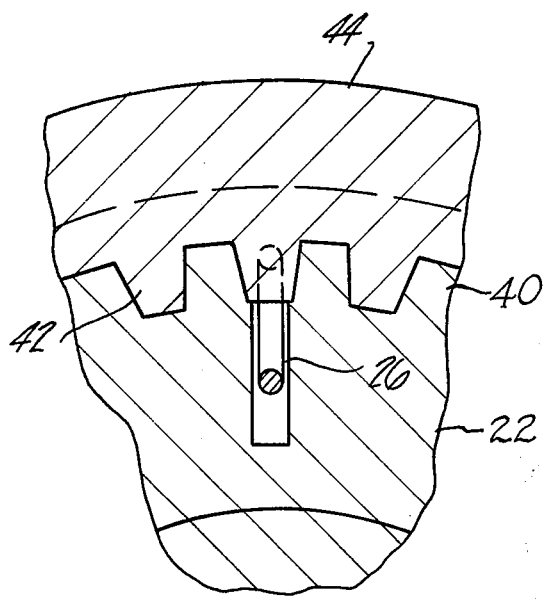

FIGS. 2 and 3 are sectional views taken on lines 2—2 and 3—3, respectively, in FIG. 1.

Figure 4:
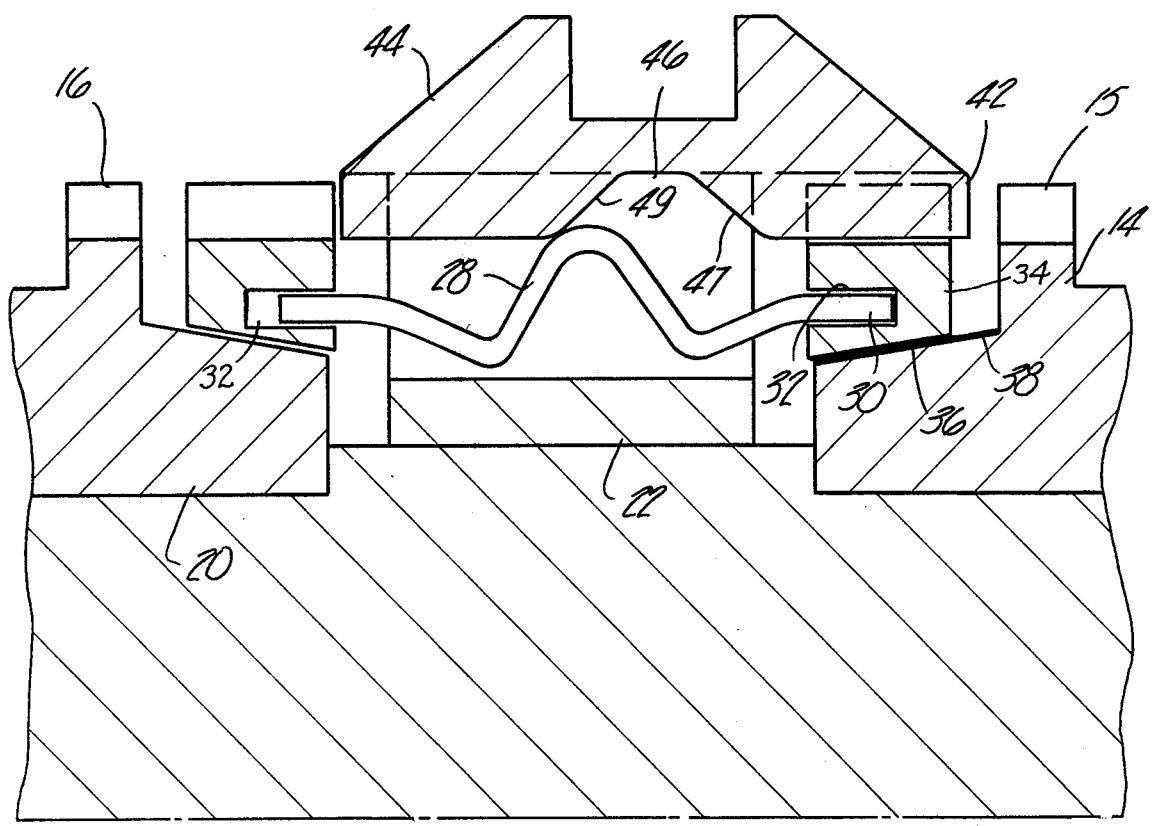

FIG. 4 is a view similar to FIG. 1 but showing the shift collar displaced axially from its center position.

The drawings show a transmission comprising a drive shaft 10 having a centerline 12. Two selectively driven pinion gear elements 14 and 16 are freely rotatably mounted on the surface areas 18 and 20 of shaft 10; spaced shoulders on the shaft, not shown, prevent axial dislodgment of each pinion gear on the shaft.

The central shaft space between pinion gears 14 and 16 is occupied by an externally splined sleeve 22 suitably affixed to the shaft. At three or more locations around its periphery the sleeve 22 is formed with a radial slot 24 for captively mounting a floatable wire spring element 26. As best seen in FIG. 1, the illustrated spring element includes a central V section 28 and two straight end sections 30. Each straight end section 30 extends axially into a blind hole 32 in a synchronizer clutch element 34. Each synchronizer clutch element consists of an externally toothed ring having an internal frusto-conical clutch surface 36. When the components are in the FIG. 1 position the ring floats on an external frusto-conical clutch surface 38 carried by the associated pinion gear 14 or 16.

The external teeth 40 on the shaft sleeve 22 mesh with internal splines 42 (FIG. 3) on an annular shift collar 44, whereby the shift collar can move axially between the FIG. 1 and FIG. 4 positions, but without rotation. The internal surface of collar 44 defines a circumferential groove 46 which accommodates the apex areas of the V sections on the spring elements 26. Side surfaces 47 and 49 of the groove 46 constitute cams for exerting axial forces on the spring elements 26 during axial displacement of the shift collar 44 from the FIG. 1 centered position. During rightward movement of the shift collar groove surface 49 operates as a cam surface; during leftward movement of the collar (from the FIG. 1 position) surface 47 acts as a cam. Axial movement of collar 44 is produced by a non-illustrated yoke having rollers or pins operatively engaged in an endless groove 50 in collar 44.

During movement of collar 44 from the FIG. 1 centered position to the FIG. 4 position cam surface 49 forcibly engages the apex area 28 of the spring element, thereby applying both axial and inward radial forces on the spring element. The right end section 30 of the spring element applies an axial force to the right synchronizer clutch 34, whereby the clutch surface 36 gradually applies an increased frictional force on the clutch surface 38. Accordingly the pinion gear gradually comes up to the speed of shaft 10 and the associated elements 22 and 44. The mechanisms are sized so that speed synchronization between clutch 34 and pinion gear 14 is achieved before the teeth 42 on collar 44 reach the teeth 15 on pinion gear 14. The slope of cam surface 49 is selected so that rightward axial force buildup on clutch element 34 is relatively gradual, thereby providing a controlled speed-up of gear 14. Groove 46 passes to the left of the tip area on the spring element V section 28 before collar 44 reaches teeth 15 on the pinion gear; at that time the pinion gear and shift collar should be fully synchronized.

It will be noted that holes 32 in each clutch element 34 are relatively deep such that sections 30 of the spring element are practically precluded from inadvertant dislodgment from the holes, even in spite of adverse factors such as manufacturing tolerance build-ups and/or wear of the clutch surfaces of other components. There is a slight tendency of the spring element to dislodge from the left clutch element 34 during rightward motion of the shift collar 44. However this can be prevented or controlled by choosing a correct slope on cam surface 49 and a reasonably heavy (stiff) wire for the spring element.

I have described the action during shift of collar 44 into engagement with pinion gear 14. It will be understood that a similar action takes place when the collar is shifted leftwardly to engagement with pinion gear 16; in that case operating cam surface is groove surface 47 rather than surface 49.

Initial installation of spring elements 26 may be one step in the clutch-gear assembly operation. Assuming that collar 44, pinion gear 16 and leftmost clutch 34 are not yet installed, then at that point in the assembly operation the various spring elements 26 can be individually inserted into slots 24 so that their right ends 30 enter into holes 32 in the right clutch 34. The ends of the spring element can fit fairly tightly in the holes if necessary to properly orient the spring elements parallel to the shaft axis. With the spring elements in place the gear 16 and leftmost clutch 34 can be moved rightwardly along shaft 10 to position the left ends of the spring elements in the respective holes 32. Collar 44 is installed as the last step in this assembly operation.

It should be noted that in the installation of spring elements 26 it is not necessary that all of the spring elements be simultaneously installed, as is the case with certain prior art arrangements. Therefore the installation process is comparatively simple; nevertheless when the spring elements are in place they are not liable to be dislodged from the mounting holes 32.

I wish it to be understood that I do not desire to be limited to the exact details of construction shown and described for obvious modifications will occur to a person skilled in the art.

I claim:

1. In a transmission comprising a drive shaft having a splined section; an internally splined shift collar keyed on the splined section of the shaft for axial movement therealong; axially spaced pinion gears freely rotatable on the shaft at opposite extremities of the splined section; a frusto-conical clutch element extending from each pinion gear in the direction of the shaft splined section; and an annular synchronizer clutch freely encircling each pinion gear clutch element, each synchronizer clutch having an internal annular clutch surface that mates with the frusto-conical clutch element whereby axial force on the respective synchronizer clutch causes same to grip the clutch element to thereby provide speed synchronization between the synchronizer clutch and associated pinion gear: the improvement comprising a number of similarly constructed spring elements operatively trained between the synchronizer clutches for exerting axial forces thereon after selected axial displacement of the shift collar from a centered position; each spring element comprising a central V section and straight end sections extending oppositely from the V extremities parallel to the shaft axis; the splined section of the shaft having a number of radial slots extending therealong, each spring element being captively oriented within one of the slots so that the plane of its V section is in a radial plane measured from the shaft axis; each synchronizer clutch having a number of axially directed blind holes in the end surface thereof nearest the splined section of the shaft, each spring element having one of its straight end sections extending into one of the blind holes; the radial slots and blind holes being sized to cooperatively preclude dislodgment of the spring elements from the axial space between the synchronizer clutches; the shift collar having a groove in its internal surface for normally containing the apex areas of the spring element V sections when the shift collar is in its centered position, the side surfaces of said groove constituting cams for exerting axial forces on the spring elements during axial displacement of the shift collar from its centered position; each spring element being formed of a single length of wire stock; the depth of the groove being such that the groove passes beyond the apex areas of the V sections before the splines on the collar reach the pinion gear in the collar path.

* * * * *